(12) United States Patent
Arafuka

(10) Patent No.: US 9,919,529 B2
(45) Date of Patent: Mar. 20, 2018

(54) CAP UNIT AND PRINTER

(71) Applicant: SEIKO EPSON CORPORATION, Tokyo (JP)

(72) Inventor: Kazushi Arafuka, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/486,028

(22) Filed: Apr. 12, 2017

(65) Prior Publication Data

US 2017/0297337 A1   Oct. 19, 2017

(30) Foreign Application Priority Data

Apr. 15, 2016   (JP) .................................. 2016-081824

(51) Int. Cl.

| B41J 2/165 | (2006.01) |
| F16H 3/36 | (2006.01) |
| F16H 27/08 | (2006.01) |
| F16H 3/34 | (2006.01) |
| F16H 3/26 | (2006.01) |

(Continued)

(52) U.S. Cl.
CPC ....... B41J 2/16505 (2013.01); B41J 2/16511 (2013.01); F16H 3/26 (2013.01); F16H 3/34 (2013.01); F16H 3/36 (2013.01); F16H 27/08 (2013.01); *B65H 2403/421* (2013.01); *B65H 2403/512* (2013.01); *F16H 27/10* (2013.01); *F16H 29/00* (2013.01)

(58) Field of Classification Search
CPC .............. B41J 2/16505; B41J 2/16511; B65H 2403/421; B65H 2403/512; F16H 27/08; F16H 27/10; F16H 3/26; F16H 3/34; F16H 3/36; F16H 29/00
See application file for complete search history.

(56) References Cited

U.S. PATENT DOCUMENTS

| 5,501,444 A | 3/1996 | Yukimachi et al. |
| 5,944,305 A | 8/1999 | Takashima et al. |

(Continued)

FOREIGN PATENT DOCUMENTS

| JP | 07-144772 | 6/1995 |
| JP | 07-235029 | 9/1995 |

(Continued)

*Primary Examiner* — Anh T. N. Vo
(74) *Attorney, Agent, or Firm* — Workman Nydegger

(57) ABSTRACT

Provided is a cap unit that can prevent or suppress collision between the drive gear and intermittent gear when the drive gear and intermittent gear begin to mesh. A cap unit 25 has a moving mechanism 28 that moves a cap 26. The moving mechanism 28 has an intermittent cam gear 36 with a cam channel 43; a drive gear 35; and a cap holder 45. The cap holder 45 includes a holding member 48 that holds the cap 26; a cam follower pin 49; a pin support mechanism 50 that supports the cam follower pin 49; and a coil spring 51 that urges the cam follower pin 49 toward the bottom 43*a* of the cam channel 43. A slope 57 is disposed to the bottom 43*a* of the cam channel 43. The cam follower pin 49 is on the slope 57 when meshing of the intermittent cam gear 36 and drive gear 35 is disengaged, and the intermittent cam gear 36 turns in conjunction with the cam follower pin 49 moving on the slope 57 due to the urging force of the coil spring 51.

8 Claims, 7 Drawing Sheets

(51) Int. Cl.
*F16H 27/10* (2006.01)
*F16H 29/00* (2006.01)

(56) References Cited

U.S. PATENT DOCUMENTS

| | | | | |
|---|---|---|---|---|
| 6,220,692 B1* | 4/2001 | Iwaya | ................. | B41J 2/16532 347/29 |
| 6,241,336 B1* | 6/2001 | Muraki | ................ | B41J 2/16511 347/29 |
| 7,182,426 B2* | 2/2007 | Takahashi | ............ | B41J 2/16547 347/29 |
| 7,637,493 B2* | 12/2009 | Ogawa | ................. | B65H 3/0669 271/114 |

FOREIGN PATENT DOCUMENTS

| | | |
|---|---|---|
| JP | 10-148984 | 6/1998 |
| JP | 10-274312 | 10/1998 |
| JP | 2004-203056 | 7/2004 |

* cited by examiner

CAP UNIT AND PRINTER

BACKGROUND

1. Technical Field

The present invention relates to a cap unit that covers the ink nozzle face of a printhead with a cap. The invention also relates to a printer having the cap unit.

2. Related Art

When the ink nozzle face of a printhead is left exposed, water evaporates from the ink inside the ink nozzles. When the water content of the ink drops due to this evaporation of water, ink viscosity rises and ink nozzles become may become clogged. Inkjet printers therefore have a cap unit, and cover the ink nozzle face with a cap to suppress the evaporation of water from the printhead while in a standby mode waiting to print, for example.

The cap unit includes a cap, and a moving mechanism for moving the cap between a capping position where the cap covers the ink nozzle face of the printhead, and an open position where the cap is removed from the ink nozzle face. The moving mechanism transfers drive power from a motor as the drive source, through a drive power transfer mechanism, to the cap. JP-A-2004-203056 describes a drive power transfer mechanism having a drive gear to which motor rotation is transferred, and an intermittent gear that meshes with the drive gear.

When the drive power transfer mechanism includes an intermittent gear, contact between the tips of the gear teeth when the drive gear and intermittent gear begin to mesh produces noise and possibly damages the tips of the teeth. To avoid such problems, the intermittent gear must be turned in the same direction of rotation after the intermittent gear and drive gear disengage so that the tips of the teeth of the intermittent gear escape from the tips of the teeth of the drive gear, and the tips of the teeth of the intermittent gear and the tips of the teeth of the drive gear do not collide the next time the teeth begin to mesh.

When the drive power transfer mechanism includes an intermittent gear, if the intermittent gear turns due to an external disturbance such as an external shock after the intermittent gear and drive gear disengage, the chance of the tips of the teeth of the intermittent gear and the tips of the teeth of the drive gear colliding the next time the teeth begin to mesh increases.

The teeth start to mesh when the intermittent gear and drive gear begin to mesh turning in the opposite direction as the direction of rotation before the gears disengaged.

SUMMARY

An objective of the invention is to provide a cap unit that, when the drive power transfer mechanism that transfers drive power from a drive source to the cap has an intermittent gear, prevents or suppresses collision between the tips of the teeth of the intermittent gear and the tips of the teeth of the drive gear when the drive gear and intermittent gear begin to mesh. Another objective is to provide a printer having the cap unit.

To achieve the foregoing objective, a cap unit according to the invention includes: a cap; and a moving mechanism that moves the cap between a capping position covering the ink nozzle face of a printhead, and an open position removed from the ink nozzle face, the moving mechanism including an intermittent cam gear having a cam channel in an end face, a drive gear able to mesh with the intermittent cam gear, and a cap holder including a holding member that holds the cap, a cam follower pin able to move inside the cam channel, a pin support mechanism that supports the cam follower pin movably in a direction perpendicular to the bottom of the cam channel, an urging member that urges the cam follower pin toward the bottom; and a slope that deepens in the direction in which the cam channel extends disposed to the bottom of the cam channel. The cam follower pin being positioned on the slope when meshing of the intermittent cam gear and drive gear is disengaged; and the intermittent cam gear turning and the intermittent part of the intermittent cam gear moving into opposition with the drive gear in conjunction with the cam follower pin sliding down the slope and moving toward the bottom of the cam channel due to the urging force of the urging member.

In this configuration, immediately after the drive gear and intermittent cam gear disengage, the cam follower pin slides on the slope and moves in the direction toward the bottom of the cam channel due to the urging force of the urging member. As a result, because the intermittent cam gear turns, the tips of the teeth of the intermittent gear can escape from the tips of the teeth of the drive gear. In addition, because the cam follower pin of the cap holder is urged to the intermittent cam gear, rotation of the intermittent cam gear can be prevented or suppressed when, for example, an external shock is applied after the intermittent cam gear and drive gear disengage. Collision between the tips of the teeth of the intermittent gear and the drive gear the next time the gears start to mesh can therefore be prevented or suppressed.

A cap unit according to another aspect of the invention preferably also has a support mechanism that supports the cap holder movably radially to the intermittent cam gear.

This configuration can accurately move the cap between the capping position and open position.

In a cap unit according to another aspect of the invention, the slope is disposed to at least one of the end part of the inside circumference side, or the end part of the outside circumference side, of the cam channel, and the end side of the end part where the slope is disposed is deep.

While the toothed parts of the drive gear and intermittent cam gear are meshed, and the cam follower pin slides through the cam channel part between the inside circumference end and outside circumference end parts of the cam channel, the tips of the teeth of the intermittent gear can escape from the tips of the teeth of the drive gear after the drive gear and intermittent cam gear disengage.

In a cap unit according to another aspect of the invention, the cam channel has a wall at the end of the cam channel on the side where the slope is disposed; and when the drive gear and the intermittent part of the intermittent cam gear are in opposition, the cam follower pin contacts the wall.

In this configuration, after sliding on the slope and moving in the direction toward the bottom of the cam channel, and causing the intermittent cam gear to turn, the cam follower pin contacts the wall and stops rotation of the intermittent cam gear. The distance the intermittent cam gear turns after the drive gear and intermittent cam gear disengage can therefore be defined by the wall disposed beside the slope.

In a cap unit according to another aspect of the invention, the slope is disposed to the end part of the inside circumference side of the cam channel; the end of the cam channel on the inside circumference side is defined by the wall; and when the drive gear and intermittent cam gear are meshed, the drive gear is driven, and the intermittent cam gear turns in a first direction of rotation, the cam follower pin slides inside the cam channel and moves to the inside circumference side of the intermittent cam gear, and the cap held by the cap holder moves from the capping position to the open position.

By driving the drive gear, this configuration can move the cap from the capping position to the open position.

In a cap unit according to another aspect of the invention, when the intermittent part of the intermittent cam gear is opposite the drive gear after the intermittent cam gear turns in the first direction of rotation, the cap is preferably set to the open position.

When the cap is at the open position in this configuration, meshing of the drive gear and intermittent cam gear is disengaged, and the tips of the teeth of the intermittent gear can escape from the tips of the teeth of the drive gear.

Further preferably in a cap unit according to another aspect of the invention, the moving mechanism has an intermittent gear with a toothed part of the same diameter and same module as the intermittent cam gear, and is disposed coaxially and movably relative to the intermittent cam gear; a non-intermittent gear with a toothed part of the same diameter and same module as the intermittent cam gear, and disposed coaxially to the intermittent cam gear on the opposite side as the intermittent cam gear; and a friction clutch disposed between the intermittent gear and the non-intermittent gear, and transferring rotation of the non-intermittent gear to the intermittent gear. The drive gear can mesh with the non-intermittent gear and the intermittent gear. The intermittent gear has a contact part, at a position offset radially from the axis of rotation of the intermittent gear, capable of contacting the intermittent cam gear. The intermittent cam gear has a contacted part capable of contacting, at a specific circumferential position, the contact part from a second direction of rotation that is opposite the first direction of rotation. When the non-intermittent gear turns in the second direction of rotation, the intermittent gear meshes with the drive gear before the intermittent cam gear and turns, and the contact part contacts the contacted part, and causes the intermittent cam gear to turn with the intermittent gear with the phase of the toothed part of the intermittent gear matching the phase of the toothed part of the intermittent cam gear.

In this configuration, when the drive gear is driven to turn the non-intermittent gear in the second direction of rotation to move the cap from the open position to the capping position, rotation of the non-intermittent gear is transferred through the friction clutch to the intermittent gear, and the intermittent gear turns in the second direction of rotation. The intermittent gear meshes with the drive gear before the intermittent cam gear. Because a friction clutch intervenes between the non-intermittent gear and intermittent gear, if there is interference between the tips of the teeth of the intermittent gear and the tips of the teeth of the drive gear, the intermittent gear and drive gear turn relative to each other, and mesh while avoiding collisions between the tips of their teeth.

In addition, when the intermittent gear turns in the second direction of rotation, the contact part of the intermittent gear contacts the contacted part of the intermittent cam gear, and the phase of the toothed part of the intermittent cam gear, and the phase of the toothed part of the intermittent gear, match.

In addition, because the intermittent gear causes the intermittent cam gear to also turn in the second direction of rotation when the contact part of the intermittent gear contacts the contacted part of the intermittent cam gear, the intermittent cam gear and drive gear mesh. Because the phase of the toothed part of the intermittent cam gear matches the phase of the toothed part of the intermittent gear already meshed with the drive gear, the teeth of the intermittent cam gear and the teeth of the drive gear do not collide when the intermittent cam gear meshes with the drive gear.

Another aspect of the invention is a printer comprising a printhead; and a cap unit that covers the ink nozzle face of the printhead, the cap unit having a moving mechanism that moves the cap between a capping position covering the ink nozzle face, and an open position removed from the ink nozzle face. The moving mechanism includes an intermittent cam gear having a cam channel in an end face; a drive gear able to mesh with the intermittent cam gear; and a cap holder including a holding member that holds the cap, a cam follower pin able to move inside the cam channel, a pin support mechanism that supports the cam follower pin movably in a direction perpendicular to the bottom of the cam channel, an urging member that urges the cam follower pin toward the bottom of the cam channel; and a slope that deepens in the direction in which the cam channel extends disposed to the bottom of the cam channel. The cam follower pin is positioned on the slope when meshing of the intermittent cam gear and drive gear is disengaged; and the intermittent cam gear turns and the intermittent part of the intermittent cam gear moves into opposition with the drive gear in conjunction with the cam follower pin sliding down the slope and moving toward the bottom of the cam channel due to the urging force of the urging member.

When a printer according to the invention goes to a standby mode, for example, the cap unit sets the cap to the capping position, and suppresses water evaporation from the printhead. The tips of the teeth of the intermittent cam gear can also escape from the tips of the teeth of the drive gear after meshing of the drive gear and intermittent cam gear of the moving mechanism that moves the cap disengage. In addition, rotation of the intermittent cam gear can be prevented or suppressed when, for example, an external shock is applied after the intermittent cam gear and drive gear disengage. Collision between the tips of the teeth of the intermittent gear and the drive gear can therefore be prevented or suppressed.

Other objects and attainments together with a fuller understanding of the invention will become apparent and appreciated by referring to the following description and claims taken in conjunction with the accompanying drawings.

DESCRIPTION OF EMBODIMENTS

A printer according to a preferred embodiment of the present invention is described below with reference to the accompanying figures.

Figure 1:
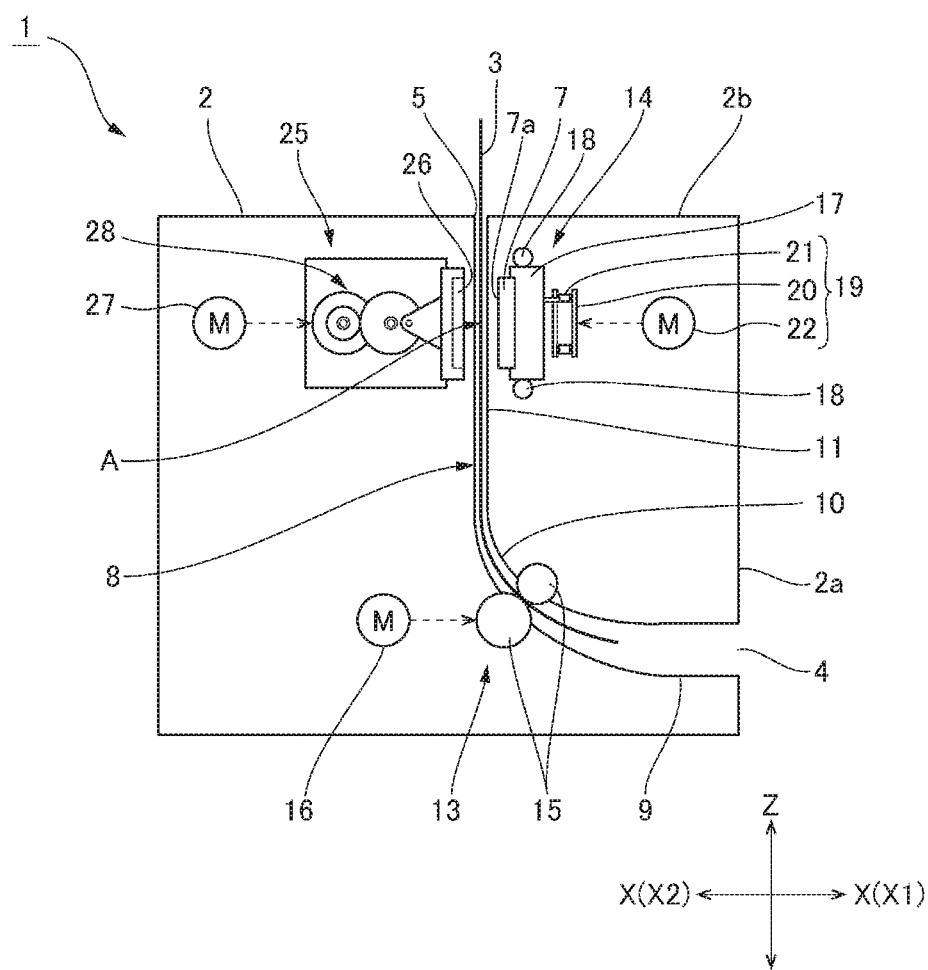
FIG. 1 is a schematic section view illustrating the internal configuration of a printer using the invention.

FIG. 1 is a schematic section view illustrating the internal configuration of a printer using the invention. As shown in FIG. 1, the printer 1 has a rectangular, box-like case 2. An entrance 4 for inserting recording paper 3 is disposed at the bottom of the front 2a of the case 2. A paper exit 5 from which the recording paper 3 is discharged is disposed in the top 2b of the case 2. The printer 1 is described below with reference to three mutually perpendicular axes, a longitudinal axis X between the front and back of the printer 1, transverse axis Y, and vertical axis Z.

The side of the printer 1 where the entrance 4 is located is referred to as the front X1 on the longitudinal axis X, and the opposite side on the longitudinal axis X is the back X2. The side of the printer 1 on one side on the transverse axis Y is referred to as the first side Y1, and the opposite side is referred to as the second side Y2. The first side Y1 is the side seen when looking at the printer 1 as shown in FIG. 1 (the left side when looking at the printer 1 from the front X1), and the opposite is the second side Y2 (the right side when looking from the front X1).

Inside the case 2 of the printer 1 are a printhead 7, and a paper conveyance path 8 going from the entrance 4, past the printing position A of the printhead 7, and to the paper exit 5. The printhead 7 is an inkjet head. The printhead 7 is rectangular with the long side on the vertical axis Z, and the ink nozzle face 7a of the printhead 7 facing the back X2. Multiple ink nozzles are aligned on the vertical axis Z on the ink nozzle face 7a.

The paper conveyance path 8 includes a horizontal path 9 extending from the entrance 4 toward the back X2, a curved path 10 curving from the back end of the horizontal path 9 toward the back X2 and up, and a vertical path 11 continuing up from the top end of the curved path 10. The printing position A is on the vertical path 11. The printhead 7 is disposed on the front X1 side of the vertical path 11.

The printer 1 also has, inside the case 2, a conveyance mechanism 13 that conveys the recording paper 3 inserted to the entrance 4 through the paper conveyance path 8, and a head moving mechanism 14 that moves the printhead 7 on the transverse axis Y.

The conveyance mechanism 13 includes a conveyance roller pair 15, and a conveyance motor 16 that drives the conveyance roller pair 15. The conveyance roller pair 15 is disposed to the curved path 10. The conveyance roller pair 15 holds and conveys the recording paper 3 inserted to the paper conveyance path 8 through the entrance 4.

The head moving mechanism 14 moves the printhead 7 between the printing position A on the vertical path 11 and a maintenance position removed from the printing position A to the second side Y2 on the transverse axis Y. The head moving mechanism 14 scans the printhead 7 on the transverse axis Y at the printing position A.

The head moving mechanism 14 includes a carriage 17; a pair of carriage guide rails 18 disposed one above the other along the transverse axis Y; and a carriage moving mechanism 19 that moves the carriage 17 along the carriage guide rails 18. The carriage 17 is positioned between the upper and lower carriage guide rails 18.

The carriage moving mechanism 19 includes a pair of pulleys 20 disposed to the opposite ends of the carriage guide rails 18 on the transverse axis Y; a timing belt 21 that goes around the pair of pulleys 20; and a carriage motor 22 that drives the pair of pulleys 20. The carriage 17 is connected to the timing belt 21.

A cap unit 25 is disposed to the maintenance position. When the printhead 7 is at the maintenance position, the cap unit 25 caps the ink nozzle face 7a of the printhead 7 with a cap 26. The cap unit 25 includes a cap 26, and a moving mechanism 28 that moves the cap 26. The cap unit 25 has a drive motor 27 as the drive source of the moving mechanism 28. The cap unit 25 is disposed at the back X2 of the printhead 7 when the printhead 7 is at the maintenance position.

When print data is supplied from an external device and recording paper 3 is inserted to the entrance 4, the printer 1 drives the conveyance motor 16 and conveys the recording paper 3 by means of the conveyance roller pair 15 through the paper conveyance path 8. The printer 1 also drives the carriage motor 22 to move the printhead 7 from the maintenance position to the printing position A. The printer 1 then drives the carriage motor 22 and printhead 7 to print the print data on the recording paper 3 as it passes the printing position A while scanning the printhead 7 on the transverse axis Y at the printing position A.

When printing ends, the printer 1 drives the carriage motor 22 to move the printhead 7 from the printing position A to the maintenance position. When the printhead 7 reaches the maintenance position, the printer 1 drives the cap unit 25 (drive motor 27) to cap the ink nozzle face 7a of the printhead 7 with the cap 26.

Cap Unit

Figure 2:
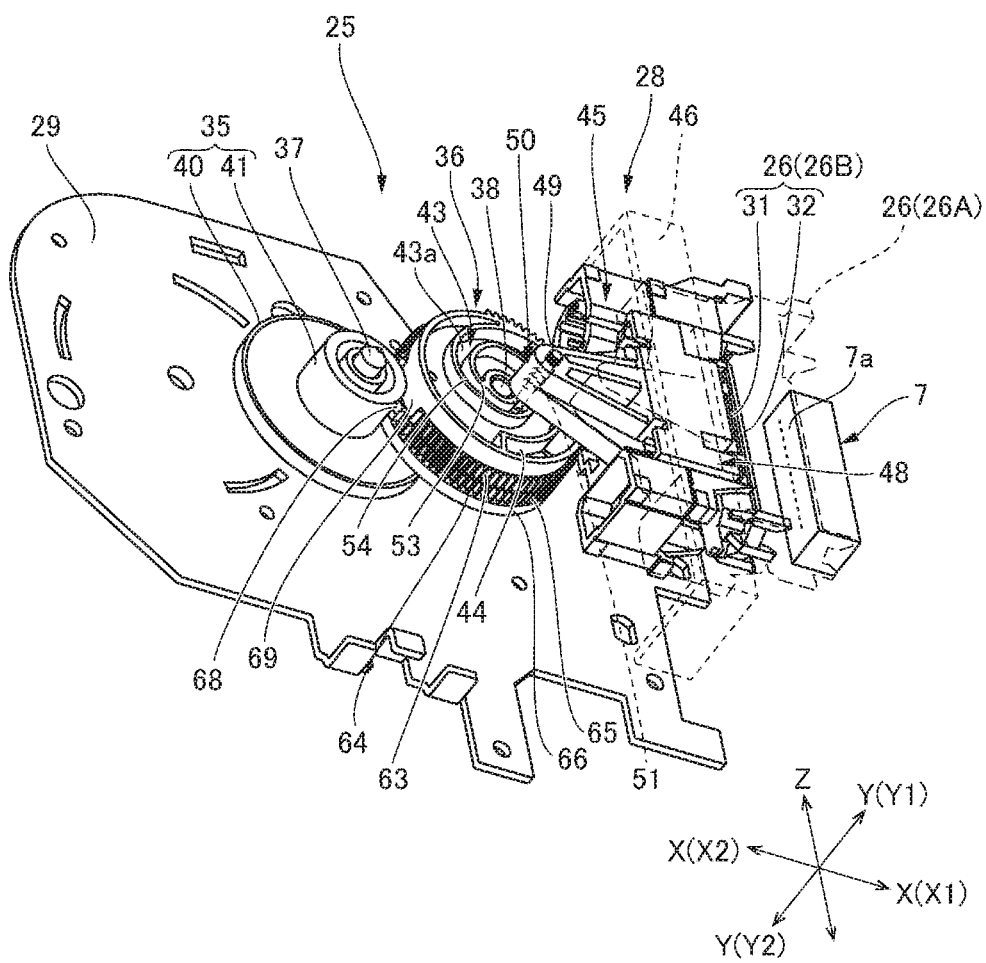
FIG. 2 is an oblique view of the cap of the cap unit and the moving mechanism.
Figure 3:
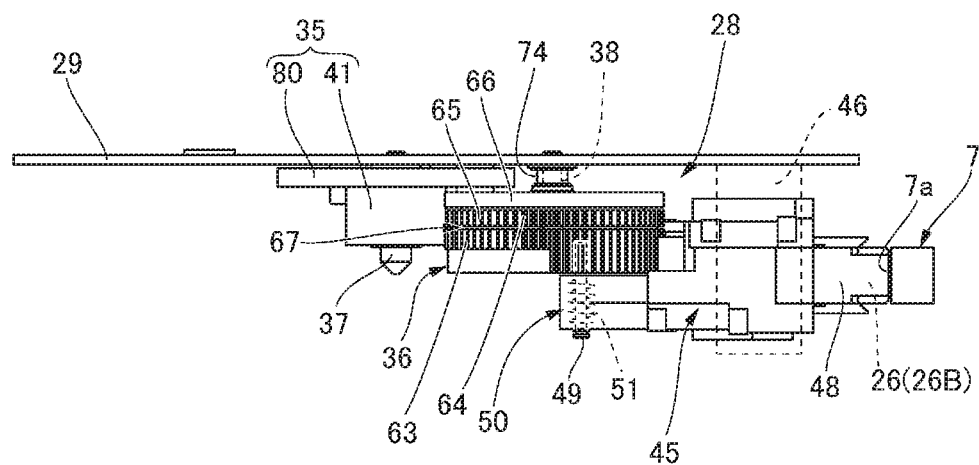
FIG. 3 is a plan view of the cap and moving mechanism.
Figure 3:
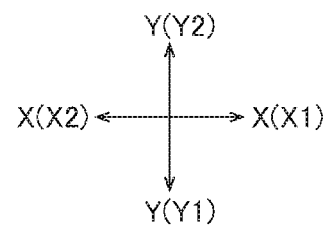

FIG. 2 is an oblique view of the cap 26 and moving mechanism 28 from the back X2 on the first side Y1. FIG. 3 is a plan view of the cap 26 and moving mechanism 28 from above. The cap unit 25 includes a cap 26, drive motor 27 (see FIG. 1), moving mechanism 28, and base frame 29. The base frame 29 extends on the longitudinal axis X and vertical axis Z, and supports the drive motor 27 and moving mechanism 28. The moving mechanism 28 moves the cap 26 between a capping position 26A covering the ink nozzle face 7a of the printhead 7, and an open position 26B removed from the ink nozzle face 7a. The capping position 26A is closer to the front X1 than the open position 26B.

The cap 26 comprises a rectangular box 31 with the open side facing the front X1 (the side where the printhead 7 is located); and a rectangular lip 32 attached to the open edge of the box 31. The lip 32 is a plastic or other elastic body that is softer than the box 31. The cap 26 can be manufactured by a two-shot plastic injection molding process, for example.

As shown in FIG. 2 and FIG. 3, the moving mechanism 28 has a drive gear 35 to which rotation of the drive motor 27 is transferred, and an intermittent cam gear 36 that can mesh with the drive gear 35.

The drive gear 35 and intermittent cam gear 36 are supported rotatably on support shafts 37, 38 protruding toward the first side Y1 from the base frame 29. The support shaft 37 of the drive gear 35 is closer to the back X2 than the support shaft 38 of the intermittent cam gear 36. The drive gear 35 is a compound gear comprising a large diameter gear 40, and a small diameter gear 41 having a smaller diameter than the large diameter gear 40 and is disposed coaxially to the large diameter gear 40. Rotation of the drive motor 27 is transferred to the large diameter gear 40 through a pinion attached to the output shaft of the drive motor 27, for example. The intermittent cam gear 36 can mesh with the small diameter gear 41. Note that in FIG. 2 and FIG. 3 the teeth of the large diameter gear 40 and the teeth of the small diameter gear 41 are not shown.

As shown in FIG. 2, the intermittent cam gear 36 has a cam channel 43 in the end face on the first side Y1 on the transverse axis Y. The intermittent cam gear 36 also has an open part 44 that communicates with the transverse axis Y (the axial direction of the support shaft 37) at a position offset radially from the support shaft 37. The open part 44 is formed in an arc defined around the center of the support shaft 37. The cam channel 43 is described in detail below.

The moving mechanism 28 also has a cap holder 45 that holds the cap 26, and a support mechanism 46 that supports the cap holder 45 movably on the longitudinal axis X (radially to the intermittent cam gear 36).

The cap holder 45 includes a holding member 48 that holds the cap 26; a cam follower pin 49 that can move inside the cam channel 43 of the intermittent cam gear 36; a pin support mechanism 50 that can move the cam follower pin 49 in a direction intersecting (in this example, a direction perpendicular to) the bottom 43a of the cam channel 43; and a coil spring 51 (urging member) that urges the cam follower pin 49 in the direction toward the bottom 43a of the cam channel 43 (toward the second side Y2).

The holding member 48 is disposed to the front end part of the cap holder 45. The pin support mechanism 50 is disposed at the back end part of the cap holder 45. The back end part of the cap holder 45 is positioned superimposed with the intermittent cam gear 36 when looking at the cap unit 25 from the transverse axis Y. The cam follower pin 49 extends on the transverse axis Y. The pin support mechanism 50 supports the cam follower pin 49 movably on the transverse axis Y, and causes the distal end of the cam follower pin 49 to project toward the intermittent cam gear 36 side (the second side Y2). The coil spring 51 urges the cam follower pin 49 to the intermittent cam gear 36 side (the second side Y2). The distal end of the cam follower pin 49 is inserted to the cam channel 43 of the intermittent cam gear 36. The cam follower pin 49 is pushed by the coil spring 51 to the bottom 43a of the cam channel 43.

The cam channel 43 of the intermittent cam gear 36 is formed in a spiral. More specifically, the cam channel 43 has an inside wall 53 spiraling from a position near the center of the intermittent cam gear 36 to the outside circumference side, and an outside wall 54 spiraling along the outside side of the inside wall 53. The bottom 43a connects the back X2 edge of the inside wall 53 with the back X2 edge of the outside wall 54.

Figure 4:
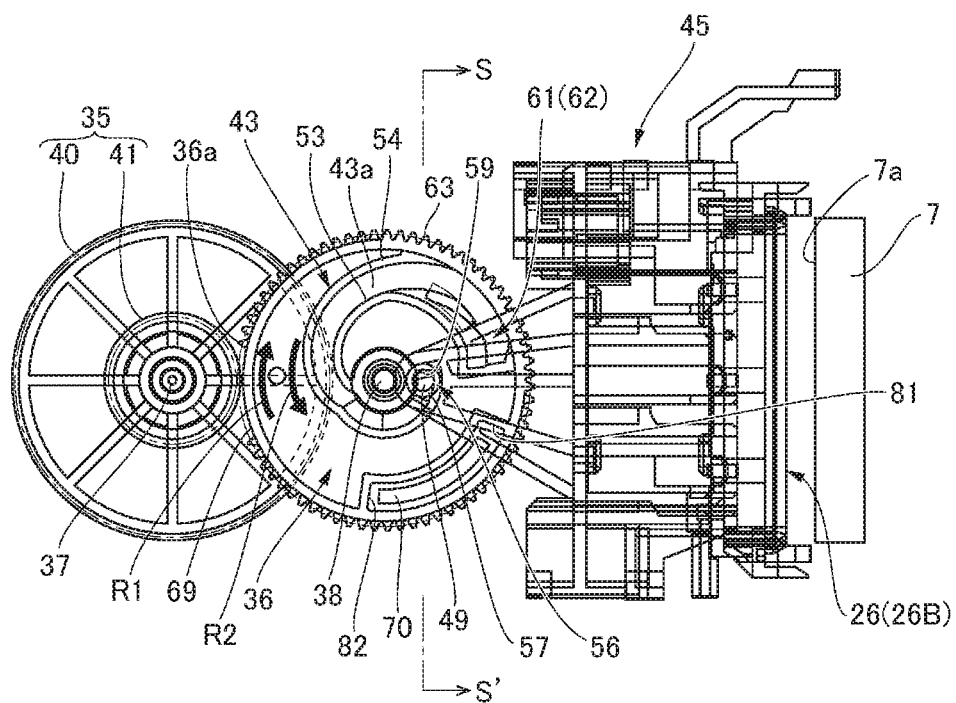
FIG. 4 is a side view of the cap and moving mechanism when the cap is in the open position.

FIG. 4 is a side view from the front X1 side of the cap 26 and moving mechanism 28 when the cap 26 is at the open position 26B.

Figure 5:
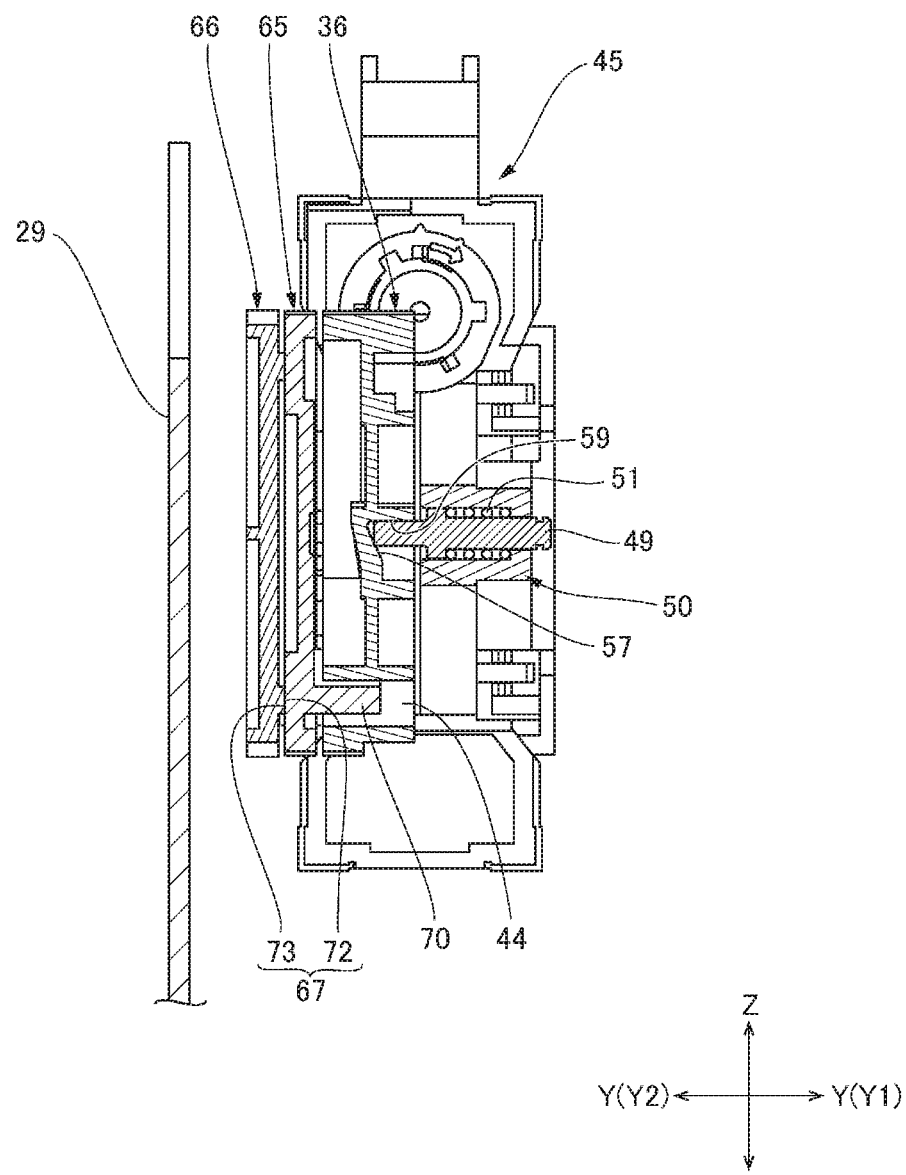
FIG. 5 is a section view through line S-S' in FIG. 4.

FIG. 5 is a section view through line S-S' in FIG. 4. The cap 26 is at the open position 26B in FIG. 4 and FIG. 5.

Figure 6:
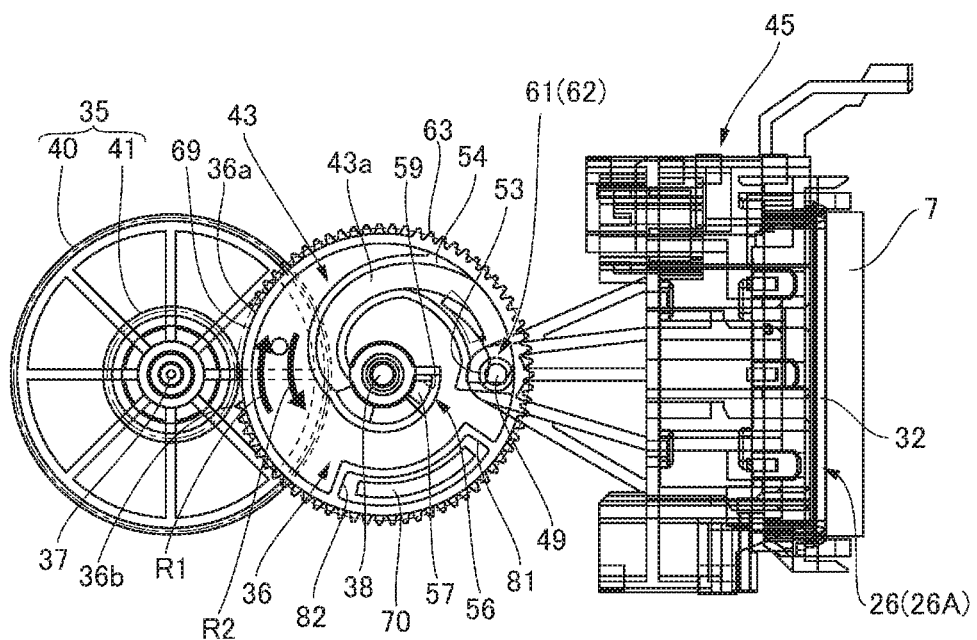
FIG. 6 is a side view of the cap and moving mechanism when the cap is in the capping position.

FIG. 6 is a side view from the front X1 side of the cap 26 and moving mechanism 28 when the cap 26 is at the capping position 26A.

Note that the base frame 29 is omitted in FIG. 4 and FIG. 6. Also, in FIG. 4 and FIG. 6, so that the relative positions of the intermittent cam gear 36 and cap holder 45 to each other can be understood, the parts of the intermittent cam gear 36 that is hidden by the cap holder 45 when seen from the front X1 are indicated by solid lines in the same way as the parts that are not hidden.

As shown in FIG. 4 and FIG. 5, a slope 57 that becomes deeper in the direction the cam channel 43 extends is formed on the bottom 43a of the inside circumference end 56 of the cam channel 43. The slope 57 descends toward the inside circumference end of the cam channel 43. An end wall 59 (wall) facing the slope 57 is disposed at the end of the end 56 portion of the cam channel 43 where the slope 57 is disposed. The end wall 59 defines the end of the inside circumference side of the cam channel 43. As shown in FIG. 4, the end 61 of cam channel 43 on the outside circumference side is a curved part 62 that curves to the inside circumference side. In other words, at the outside circumference end 61 of the cam channel 43, the inside wall 53 and the outside wall 54 of the cam channel 43 extend straight to the inside circumference side.

When the toothed part 63 of the intermittent cam gear 36 meshes with the drive gear 35 and turns, the cam follower pin 49 slides through the cam channel between the end 56 on the inside circumference side and the end 61 on the outside circumference side of the cam channel 43. When the cam follower pin 49 is at the inside circumference end of the cam channel 43, the cap 26 held by the cap holder 45 is positioned to the open position 26B (see FIG. 4). When the cam follower pin 49 moves to the outside circumference end of the cam channel 43, the cap 26 held by the cap holder 45 is positioned to the capping position 26A (see FIG. 6).

As shown in FIG. 2, FIG. 3, and FIG. 5, the moving mechanism 28 includes an intermittent gear 65 disposed coaxially to the intermittent cam gear 36; a non-intermittent gear 66 with teeth around the entire circumference disposed coaxially on the opposite side of the intermittent gear 65 as the intermittent cam gear 36; and a friction clutch 67 configured between the intermittent gear 65 and non-intermittent gear 66. The intermittent gear 65 and non-intermittent gear 66 are supported rotatably on the support shaft 38. The intermittent gear 65 can mesh with the drive gear 35, and the non-intermittent gear 66 meshes with the drive gear 35.

The intermittent gear 65 has a toothed part of the same diameter and same module as the intermittent cam gear 36. The number of teeth in the toothed part 64 of the intermittent gear 65 is greater than the number of teeth in the toothed part 63 of the intermittent cam gear 36. As shown in FIG. 2, the area of the intermittent part 68 where teeth are not formed on the intermittent gear 65 is therefore smaller than the area of the intermittent part 69 of the intermittent cam gear 36.

When seen on the transverse axis Y (in line with the axis of rotation), the intermittent gear 65 and intermittent cam gear 36 are disposed to angular positions where the intermittent part 69 of the intermittent cam gear 36 and the intermittent part 68 of the intermittent gear 65 overlap. The intermittent gear 65 and intermittent cam gear 36 can also rotate relative to each other.

As shown in FIG. 5, the intermittent gear 65 has, on the intermittent cam gear 36 side face at a position separated radially from the axis of rotation, a protrusion 70 (contact part) that protrudes to the intermittent cam gear 36 side. The protrusion 70 is inserted to the open part 44 of the intermittent cam gear 36. When the intermittent gear 65 and intermittent cam gear 36 turn relative to each other, the protrusion 70 can move circumferentially inside the open part 44.

The toothed part of the non-intermittent gear 66 has the same diameter and same module as the intermittent cam gear 36.

As shown in FIG. 5, the friction clutch 67 has a round contact surface 72 disposed in the face of the non-intermittent gear 66 on the intermittent gear 65 side, and an annular contacted part 73 disposed to a position on the intermittent gear 65 that contacts the contact surface 72. As shown in FIG. 3, the non-intermittent gear 66 is urged, by an urging spring 74 disposed between the base frame 29 and non-intermittent gear 66, from the opposite side as the intermittent gear 65, to the intermittent gear 65. Rotation of the non-intermittent gear 66 is therefore transferred through the friction clutch 67 to the intermittent gear 65. As a result, when the non-intermittent gear 66 turns, the intermittent gear 65 turns in unison with the non-intermittent gear 66. When a load is applied to the intermittent gear 65, such as from interference between the tip of the teeth of the drive gear 35 and the tip of the teeth of the intermittent gear 65, the intermittent gear 65 turns relative to the non-intermittent gear 66 and the load is relieved.

Movement of the Cap by the Cap Unit

Figure 7:
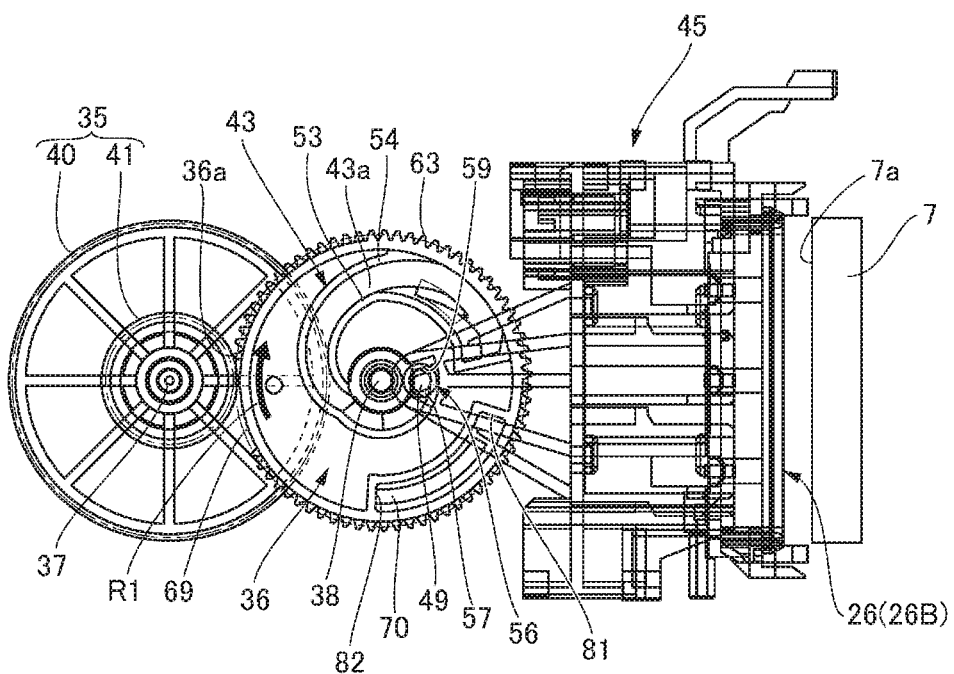
FIG. 7 is a side view of the cap and moving mechanism when the intermittent cam gear disengages.

Movement of the cap 26 by the cap unit 25 is described next with reference to FIG. 4 to FIG. 7. FIG. 7 is a side view from the first side Y1 of the state just after meshing of the drive gear 35 and intermittent cam gear 36 disengages.

When the drive gear 35 and intermittent cam gear 36 are meshed, the drive gear 35 is driven, and the intermittent cam gear 36 turns in first direction of rotation R1, the cam follower pin 49 slides in the cam channel 43 and moves to the inside circumference side (back X2) of the intermittent cam gear 36. As a result, the cap holder 45 moves to the back X2, and the cap 26 held by the cap holder 45 moves to the back X2 (the opening direction from the capping position 26A to the open position 26B).

As shown in FIG. 4, when the cam follower pin 49 then reaches the end 56 on the inside circumference side of the cam channel 43, the cap 26 reaches the open position 26B. When the cam follower pin 49 reaches the end 56 on the inside circumference side of the cam channel 43, the drive gear 35 and intermittent cam gear 36 disengage. More specifically, the tooth 36a at the end of the toothed part 63 of the intermittent cam gear 36 in the first direction of rotation R1 disengages the drive gear 35.

When the intermittent cam gear 36 stops turning when the drive gear 35 and intermittent cam gear 36 have disengaged, the tip of the tooth 65a that last engaged the drive gear 35, and the tip of a tooth of the drive gear 35, may collide the next time the gears start to mesh. The next time the gears start to mesh is when the drive gear 35 turns in the opposite direction of rotation as the direction of rotation before the gears disengaged, and begins to engage the tooth 65a of the intermittent cam gear 36. In other words, the gears begin to mesh when the drive gear 35 begins to engage the tooth 65a of the intermittent cam gear 36 when the cap 26 is moved from the open position 26B to the capping position 26A.

To solve this problem, in this example, as shown in FIG. 7, the cam follower pin 49 is positioned on the slope 57 of the cam channel 43 when the intermittent cam gear 36 and drive gear 35 are disengaged. Therefore, the cam follower pin 49 moves, by the urging force of the coil spring 51, in the direction toward the bottom 43a (second side Y2) while sliding down the slope 57. Because the slope 57 is inclined and goes deeper towards the back of the first direction of rotation R1, when the cam follower pin 49 moves while sliding down the slope 57, the intermittent cam gear 36 is pushed by the cam follower pin 49 and turns in the first direction of rotation R1. As a result, as shown in FIG. 4, the drive gear 35 and the intermittent part 69 of the intermittent cam gear 36, are in opposition. More specifically, the tip of the teeth 36a of the intermittent cam gear 36 separates from (disengages) the teeth of the drive gear 35. Collision between the tips of the teeth 36a of the intermittent cam gear 36, and the tips of the teeth of the drive gear 35, when the gears next start to mesh can therefore be prevented or suppressed.

The cam follower pin 49 that slid down the slope 57 then meets the end wall 59 of the cam channel 43. When the cam follower pin 49 contacts the end wall 59, rotation of the intermittent cam gear 36 stops. Contact between the cam follower pin 49 and end wall 59 therefore limits rotation of the intermittent cam gear 36 in the first direction of rotation R1 after the intermittent cam gear 36 and drive gear 35 have disengaged.

When the cap 26 is then moved from the open position 26B to the capping position 26A, the drive gear 35 is driven in the opposite direction as the direction described above from the position shown in FIG. 4, thereby turning the non-intermittent gear 66 in the second direction of rotation R2, which is opposite the first direction of rotation R1. When the non-intermittent gear 66 turns in the second direction of rotation R2, the non-intermittent gear 66 rotation is transferred through the friction clutch 67 to the intermittent gear 65. The intermittent gear 65 therefore turns in the second direction of rotation R2. Because the intermittent part 68 of the intermittent gear 65 is shorter than the intermittent part 69 of the intermittent cam gear 36, the intermittent gear 65 turning in the second direction of rotation R2 meshes with the drive gear 35 before the intermittent cam gear 36.

The intermittent gear 65 and drive gear 35 mesh without teeth thereof colliding. More specifically, because the friction clutch 67 intervenes between the non-intermittent gear 66 and intermittent gear 65, when the tip of a tooth of the intermittent gear 65 and the tip of a tooth of the drive gear 35 meet and load is applied to the intermittent gear 65, the intermittent gear 65 rotates in relation to the non-intermittent gear 66 and relieves the load. As a result, the intermittent gear 65 and drive gear 35 can mesh while avoiding collisions between their teeth.

When the intermittent gear 65 meshed with the drive gear 35 then turns in the second direction of rotation R2, the protrusion 70 (contact part) of the intermittent gear 65 contacts the inside wall of the open part 44 of the intermittent cam gear 36 from the back X2 in the second direction of rotation R2. More specifically, the protrusion 70 of the intermittent gear 65 contacts the inside wall part 81 defining the front end of the open part 44 of the intermittent cam gear 36 in the second direction of rotation R2.

When the protrusion 70 of the intermittent gear 65 contacts the inside wall part 81 of the open part 44 of the intermittent cam gear 36, the phase of the toothed part 63 of the intermittent cam gear 36, and the phase of the toothed part 64 of the intermittent gear 65 already meshed with the drive gear 35, match. In addition, when the protrusion 70 of the intermittent gear 65 is in contact with the inside wall part 81 of the open part 44 of the intermittent cam gear 36, and the intermittent gear 65 meshed with the drive gear 35 turns in the second direction of rotation R2, the intermittent gear 65 causes the intermittent cam gear 36 to also turn in the second direction of rotation R2. The intermittent cam gear 36 therefore meshes with the drive gear 35. The phase of the toothed part 63 of the intermittent cam gear 36, and the phase of the toothed part 64 of the intermittent gear 65 already meshed with the drive gear 35, match. Therefore, when the intermittent cam gear 36 meshes with the drive gear 35, the tip of the tooth 36a of the intermittent cam gear 36, and the tips of the teeth of the drive gear 35, do not collide.

When the intermittent cam gear 36 then turns in the second direction of rotation R2 due to engagement with the drive gear 35, the cam follower pin 49 slides along the cam channel 43 and moves to the outside circumference side (front X1) of the intermittent cam gear 36. As a result, the cap holder 45 moves to the front X1, and the cap 26 held by the cap holder 45 moves to the front X1 (the direction from the open position 26B to the capping position 26A).

As shown in FIG. 6, when the cam follower pin 49 reaches the outside circumference end 61 of the cam channel 43, the cap 26 is set to the capping position 26A. When the cam follower pin 49 reaches the outside circumference end 61 of the cam channel 43, meshing of the drive gear 35 and intermittent cam gear 36 is also disengaged.

When the intermittent cam gear 36 stops turning when the drive gear 35 and intermittent cam gear 36 have disengaged, the tip of the tooth 65b that last engaged the drive gear 35, and the tip of a tooth of the drive gear 35, may collide the next time the gears start to mesh. The next time the gears start to mesh is when the drive gear 35 turns in the opposite direction of rotation as the direction of rotation before the gears disengaged, and begins to engage the tooth 65b of the intermittent cam gear 36. In other words, the gears begin to mesh when the drive gear 35 begins to engage the tooth 65b of the intermittent cam gear 36 when the cap 26 is moved from the capping position 26A to the open position 26B.

In contrast, when meshing of the drive gear 35 and intermittent cam gear 36 disengage, the cam follower pin 49 is in the curved part 62 (end 61) of the cam channel 43. Because the lip 32 of the cap 26 is pressed against the ink nozzle face 7a of the printhead 7 in the capping position 26A, the elastic restoring force of the lip 32 causes the cam follower pin 49 to slide along the inside wall 53 of the curved part 62 and move to the inside circumference side of the intermittent cam gear 36. Because the inside wall 53 of the curved part 62 slopes to the inside circumference side toward the back of the second direction of rotation R2, when the cam follower pin 49 slides along the inside wall 53 of the curved part 62 and moves to the inside circumference side of the intermittent cam gear 36, the intermittent cam gear 36 is pushed by the cam follower pin 49 and moves in the second direction of rotation R2. As a result, as shown in FIG. 6, the tip of the tooth 36b of the intermittent cam gear 36 separates from (disengages) the teeth of the drive gear 35, and the drive gear 35 and the intermittent part 69 of the intermittent cam gear 36 go in opposition. The tip of the tooth 36b of the intermittent cam gear 36, and the tip of the teeth of the drive gear 35, colliding when the gears start to mesh next time can therefore be prevented or suppressed.

When then moving the cap 26 from the capping position 26A to the open position 26B, the drive gear 35 again turns in the opposite direction, and the non-intermittent gear 66 turns in the first direction of rotation R1. When the non-intermittent gear 66 turns in the first direction of rotation R1, the rotation is transferred through the friction clutch 67 to the intermittent gear 65. The intermittent gear 65 therefore turns in the second direction of rotation R1. Because the intermittent part 68 of the intermittent gear 65 is shorter than the intermittent part 69 of the intermittent cam gear 36, the intermittent gear 65 turning in the second direction of rotation R1 meshes with the drive gear 35 before the intermittent cam gear 36. The intermittent gear 65 therefore turns in the first direction of rotation R1. Because the intermittent part 68 of the intermittent gear 65 is shorter than the intermittent part 69 of the intermittent cam gear 36, the intermittent gear 65 turning in the first direction of rotation R1 meshes with the drive gear 35 before the intermittent cam gear 36. Because the friction clutch 67 intervenes between the non-intermittent gear 66 and intermittent gear 65, the intermittent gear 65 and drive gear 35 mesh without their teeth colliding.

When the intermittent gear 65 meshed with the drive gear 35 then turns in the first direction of rotation R1, the protrusion 70 of the intermittent gear 65 contacts the inside wall of the open part 44 of the intermittent cam gear 36 from the back X2 in the first direction of rotation R1. More specifically, the protrusion 70 of the intermittent gear 65 contacts the inside wall part 82 defining the front end of the open part 44 of the intermittent cam gear 36 in the first direction of rotation R1. As a result, the phase of the toothed part 63 of the intermittent cam gear 36, and the phase of the toothed part 64 of the intermittent gear 65 already meshed with the drive gear 35, match. In addition, when the protrusion 70 of the intermittent gear 65 is in contact with the inside wall part 82 of the open part 44 of the intermittent cam gear 36, and the intermittent gear 65 turns further, the intermittent gear 65 causes the intermittent cam gear 36 to also turn in the first direction of rotation R1. The intermittent cam gear 36 therefore meshes with the drive gear 35. The phase of the toothed part 63 of the intermittent cam gear 36, and the phase of the toothed part 64 of the intermittent gear 65 already meshed with the drive gear 35, match. Therefore, when the intermittent cam gear 36 meshes with the drive gear 35, the tip of the tooth 36a of the intermittent cam gear 36, and the tips of the teeth of the drive gear 35, do not collide.

When the intermittent cam gear 36 then turns further in the first direction of rotation R1 due to engagement with the drive gear 35, the cam follower pin 49 slides along the cam channel 43 and moves to the inside circumference side (front X1) of the intermittent cam gear 36. As a result, the cap holder 45 moves to the back X2, and the cap 26 held by the cap holder 45 moves to the back X2 (the direction from the capping position 26A to the open position 26B).

When the cam follower pin 49 then reaches the inside circumference end 61 of the cam channel 43, the cap 26 is set to the open position 26B. When the cam follower pin 49 reaches the inside circumference end 56 of the cam channel 43, meshing of the drive gear 35 and intermittent cam gear 36 is also disengaged.

If the intermittent gear 65 turns due to an external disturbance such as a physical shock after the intermittent gear 65 and drive gear 35 disengage, the tip of a tooth of the intermittent gear 65 and the tip of a tooth of the drive gear 35 colliding when the gears begin to mesh next increases.

To solve this, the cam follower pin 49 of the cap holder 45 in this example is pushed by the urging force of the coil spring 51 to the intermittent cam gear 36. Rotation of the intermittent cam gear 36 can therefore be prevented or suppressed even when an external impact is applied after the intermittent cam gear 36 and drive gear 35 disengage. As a result, collision between the tips of teeth in the intermittent gear 65 and the tips of teeth in the drive gear 35 when the gears next mesh can be prevented.

OTHER EXAMPLES

A slope 57 is provided on the inside circumference end 56 of the cam channel 43 in the embodiment described above, but a slope that goes deeper toward the outside circumference end may be provided on the outside circumference end 61 of the cam channel 43.

In this configuration, when the cap 26 moves to the capping position 26A, and the drive gear 35 and intermittent cam gear 36 disengage, the cam follower pin 49 is positioned on the slope of the outside circumference end 61 of the cam channel 43. Therefore, the urging force of the coil spring 51 causes the cam follower pin 49 to slide along the slope in the direction toward the bottom 43a (second side Y2).

Because the slope is inclined in the direction becoming deeper towards the back of the second direction of rotation R2, when the cam follower pin 49 moves sliding along the slope 57, the intermittent cam gear 36 is pushed by the cam follower pin 49 and turns in the second direction of rotation R2.

As a result, the tip of the tooth 36b of the intermittent cam gear 36 separates from (disengages) the drive gear 35, and the drive gear 35 and intermittent part 69 of the intermittent cam gear 36 are in opposition. Collisions between the tip of the tooth 36b of the intermittent cam gear 36 and the tips of the teeth of the drive gear 35 when the gears next begin to mesh can be prevented or suppressed. Note that when a slope 57 is provided on the outside circumference end 61 of the cam channel 43, there is no need to provide the curved part 62 at the outside circumference end 61 of the cam channel 43.

The entire disclosure of Japanese Patent Application No: 2016-081824, filed Apr. 15, 2016 is expressly incorporated by reference herein in its entirety.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A cap unit comprising:
   a cap; and
   a moving mechanism that moves the cap between a capping position covering a ink nozzle face of a printhead, and an open position removed from the ink nozzle face,
   the moving mechanism including an intermittent cam gear having a cam channel in an end face,
      a drive gear able to mesh with the intermittent cam gear, and
      a cap holder including a holding member that holds the cap,
         a cam follower pin able to move inside the cam channel,
         a pin support mechanism that supports a cam follower pin movably in a direction perpendicular to a bottom of the cam channel,
         an urging member that urges the cam follower pin toward the bottom; and
         a slope that deepens in the direction in which the cam channel extends disposed to the bottom of the cam channel;
      the cam follower pin being positioned on the slope when meshing of the intermittent cam gear and drive gear is disengaged; and
         the intermittent cam gear turning and the intermittent part of the intermittent cam gear moving into opposition with the drive gear in conjunction with the cam follower pin sliding down the slope and moving toward the bottom of the cam channel due to an urging force of the urging member.

2. The cap unit described in claim 1, further comprising:
   a support mechanism that supports the cap holder movably radially to the intermittent cam gear.

3. The cap unit described in claim 1, wherein:
   the slope is disposed to at least one of the end part of the inside circumference side, or the end part of the outside circumference side, of the cam channel, and the end side of the end part where the slope is disposed is deep.

4. The cap unit described in claim 3, wherein:
   the cam channel has a wall at the end of the cam channel on the side where the slope is disposed; and
   when the drive gear and the intermittent part of the intermittent cam gear are in opposition, the cam follower pin contacts the wall.

5. The cap unit described in claim 4, wherein:
   the slope is disposed to the end part of the inside circumference side of the cam channel;
   the end of the cam channel on the inside circumference side is defined by the wall; and
   when the drive gear and intermittent cam gear are meshed, the drive gear is driven, and the intermittent cam gear turns in a first direction of rotation, the cam follower pin slides inside the cam channel and moves to the inside circumference side of the intermittent cam gear, and the cap held by the cap holder moves from the capping position to the open position.

6. The cap unit described in claim 5, wherein:
   when the intermittent part of the intermittent cam gear is opposite the drive gear after the intermittent cam gear turns in the first direction of rotation, the cap is set to the open position.

7. The cap unit described in claim 5, wherein:
   the moving mechanism has an intermittent gear with a toothed part of the same diameter and same module as the intermittent cam gear, and is disposed coaxially and movably relative to the intermittent cam gear;
      a non-intermittent gear with a toothed part of the same diameter and same module as the intermittent cam gear, and disposed coaxially to the intermittent cam gear on the opposite side as the intermittent cam gear; and
      a friction clutch disposed between the intermittent gear and the non-intermittent gear, and transferring rotation of the non-intermittent gear to the intermittent gear;
   the drive gear capable of meshing with the non-intermittent gear and the intermittent gear;
   the intermittent gear having a contact part, at a position offset radially from the axis of rotation of the intermittent gear, capable of contacting the intermittent cam gear;
   the intermittent cam gear having a contacted part capable of contacting, at a specific circumferential position, the contact part from a second direction of rotation that is opposite the first direction of rotation; and
   when the non-intermittent gear turns in the second direction of rotation, the intermittent gear meshes with the drive gear before the intermittent cam gear and turns, and the contact part contacts the contacted part, and causes the intermittent cam gear to turn with the intermittent gear with the phase of the toothed part of the intermittent gear matching the phase of the toothed part of the intermittent cam gear.

8. A printer comprising:
   a printhead; and
   a cap unit that covers a ink nozzle face of the printhead, the cap unit having a moving mechanism that moves the cap between a capping position covering the ink nozzle face, and an open position removed from the ink nozzle face;
      the moving mechanism including an intermittent cam gear having a cam channel in an end face,
      a drive gear able to mesh with the intermittent cam gear, and
      a cap holder including a holding member that holds the cap,
         a cam follower pin able to move inside the cam channel,
         a pin support mechanism that supports the cam follower pin movably in a direction perpendicular to a bottom of the cam channel, an urging member that urges the cam follower pin toward the bottom of the cam channel; and a slope that deepens in the direction in which the cam channel extends disposed to the bottom of the cam channel;

the cam follower pin being positioned on the slope when meshing of the intermittent cam gear and drive gear is disengaged; and the intermittent cam gear turning and the intermittent part of the intermittent cam gear moving into opposition with the drive gear in conjunction with the cam follower pin sliding down the slope and moving toward the bottom of the cam channel due to an urging force of the urging member.

* * * * *